United States Patent [19]

Peltier

[11] Patent Number: 5,611,248
[45] Date of Patent: Mar. 18, 1997

[54] TWO-AXIS ROBOT

[75] Inventor: Kenneth J. Peltier, Waterloo, Canada

[73] Assignee: ATS Automation Tooling Systems Inc., Cambridge, Canada

[21] Appl. No.: 458,255

[22] Filed: Jun. 2, 1995

[51] Int. Cl.$^6$ ............................................. B25J 5/00
[52] U.S. Cl. ................ 74/490.09; 74/89.22; 74/490.04; 414/749; 901/21
[58] Field of Search ............................. 414/749; 901/21; 74/490.03, 490.04, 490.08, 490.09, 490.1, 89.22

[56] References Cited

U.S. PATENT DOCUMENTS

| 3,273,408 | 9/1966 | Nagel et al. | 74/89.22 X |
| 4,524,520 | 6/1985 | Levy | 74/89.22 X |
| 4,566,346 | 1/1986 | Petiteau | 74/89.22 |

FOREIGN PATENT DOCUMENTS

| 0292151 | 12/1990 | Japan | 901/21 |

*Primary Examiner*—Donald W. Underwood
*Attorney, Agent, or Firm*—R. Craig Armstrong

[57] ABSTRACT

The robot has a first rail which extends in one direction and has a first slide mounted thereon, the first slide being slidable along the rail. A second rail extends away from the first rail, and has one end secured to the first slide. First and second motors are mounted in fixed positions relative to the first rail, the motors driving first and second drive belts. The first drive belt is attached to the first slide, thence routed around a first pulley at one end of the first rail, thence around a second pulley at the other end of the first rail, and thence back to the first slide. This produces movement of the first slide along the first rail. The second drive belt is routed from a third pulley at one end of the first rail, thence around a fourth pulley at the other end of the first rail, thence around a fifth pulley mounted on the first slide, thence out the second rail and around a sixth pulley mounted on the second rail, thence back towards the first rail and around a seventh pulley mounted on the first slide, and thence back to and around the third pulley. A computer controls and coordinates the first and second motors to produce movement of the first slide along a first axis by operation of the first motor, and to produce movement along or about a second axis by operation of the second motor in coordination with the first motor. In the preferred embodiment, the second axis movement is movement of a second slide, slidably mounted on the second rail for movement therealong, secured to the second drive belt. In an alternative embodiment, the second axis movement is θ or rotational movement of a rotatable element mounted on the second rail.

2 Claims, 7 Drawing Sheets

5,611,248

TWO-AXIS ROBOT

BACKGROUND OF THE INVENTION

1. Field of the Invention

This invention relates to the field of automated robots used in a variety of applications.

2. Description of the Prior Art

Robotic arms are now being used as standard components of assembly lines because of their numerous advantages. These advantages when compared to their human counterparts may include: greater precision, faster speed, more reliability, less down time, less damage and/or loss in case of an accident, and less cost over the long term.

Despite these advantages, they also possess disadvantages which make them difficult to apply in an industrial setting. These include, but are not limited to (1) the general size of drive mechanisms (motors, pneumatics, hydraulics, etc.), (2) the complexity in controls, (3) the mechanical stability of the design in general, (4) the inertia which needs to be accelerated and decelerated, (5) the range of motion that is desired from the robot, (6) the accuracy in placement of components or the end manipulator, and so on. Added complexity implies increases in costs as well as other factors.

By creating specific optimised designs and realisations of robots, they can be useful in a variety of applications without much modification to the design. However, the robots then become too sophisticated and too expensive for many other applications, since the robots will have many features which are not necessary for the desired applications. It is difficult to realize a simple design which has good versatility and which addresses the above disadvantages.

There are a number of patented inventions which have attempted to deal with some of these problems. For example, U.S. Pat. No. 32,414 by Hutchins et al., U.S. Pat. No. 5,063,334 by Tanita et al., U.S. Pat. No. 5,265,490 by Azuma et al., U.S. Pat. No. 5,198,736 by Azuma et al., and U.S. Pat. No. 5,324,163 by Costa all show the use of belts for transferring power and movement so that the motors may remain stationary relative to the moving parts of the robot. However, there still remains a need for a robot which has minimal moving mass, a high placement accuracy, a high repeatability, simple controllers, and which is relatively inexpensive to manufacture.

SUMMARY OF THE INVENTION

It is an object of the invention to provide for a robot which has a simple design for ease of manufacturing, and which employs stationary motors in order to minimize the moving mass.

In the invention, a first rail extends in one direction and has a first slide mounted thereon, the first slide being slidable along the rail. A second rail extends away from the first rail, and has one end secured to the first slide. First and second motors are mounted in fixed positions relative to the first rail, the motors driving first and second drive means respectively, namely cables, chains, or preferably gear belts. The first drive means is attached to the first slide, thence routed around a first pulley at a first location along the first rail, thence around a second pulley at a second location spaced from the first location, and thence back to the first slide. This produces movement of the first slide between the first and second locations by operation of the first motor. The second drive means is routed from a third pulley at a third location along the first rail, thence around a fourth pulley at a fourth location spaced from the third location, thence around a fifth pulley mounted on the first slide, thence out the second rail and around a sixth pulley mounted on the second rail, thence back towards the first rail and around a seventh pulley mounted on the first slide, and thence back to and around the third pulley. Control means are provided for controlling and coordinating the first and second motors to produce movement of the first slide along a first axis by operation of the first motor, and to produce movement along or about a second axis by operation of the second motor in coordination with the first motor.

In the preferred embodiment, the second axis movement is movement of a second slide, slidably mounted on the second rail for movement therealong, secured to the second drive means between the sixth pulley and either one of the fifth or seventh pulleys.

In an alternative embodiment, the second axis movement is "theta" or rotational movement of a rotatable element mounted on the second rail, connected for rotation by the second drive means. In other embodiments, other axes of motion may be selected as desired, using the same drive means configuration principle.

Further features of the invention will be described or will become apparent in the course of the following detailed description.

BRIEF DESCRIPTION OF THE DRAWINGS

In order that the invention may be more clearly understood, the preferred embodiment thereof will now be described in detail by way of example, with reference to the accompanying drawings, in which.

DETAILED DESCRIPTION OF THE PREFERRED AND ALTERNATIVE EMBODIMENTS

Figure 1:
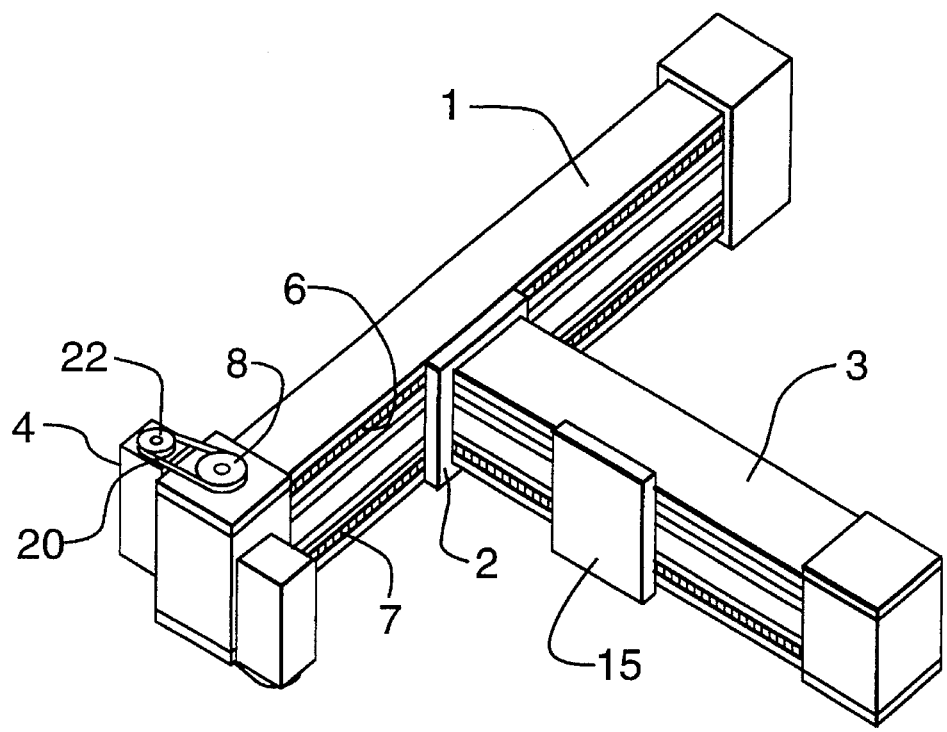
FIG. 1 is a perspective view of the preferred embodiment.
Figure 2:
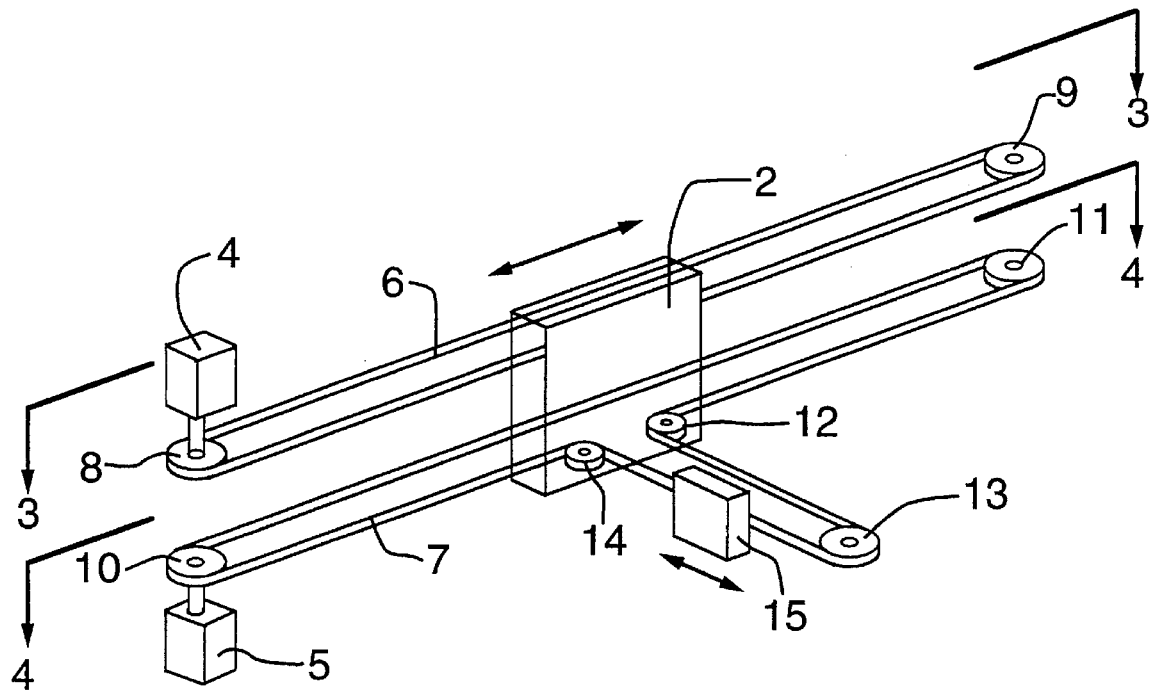
FIG. 2 is a schematic perspective of the preferred embodiment, corresponding to FIG. 1, showing the principle of operation.
Figure 3:
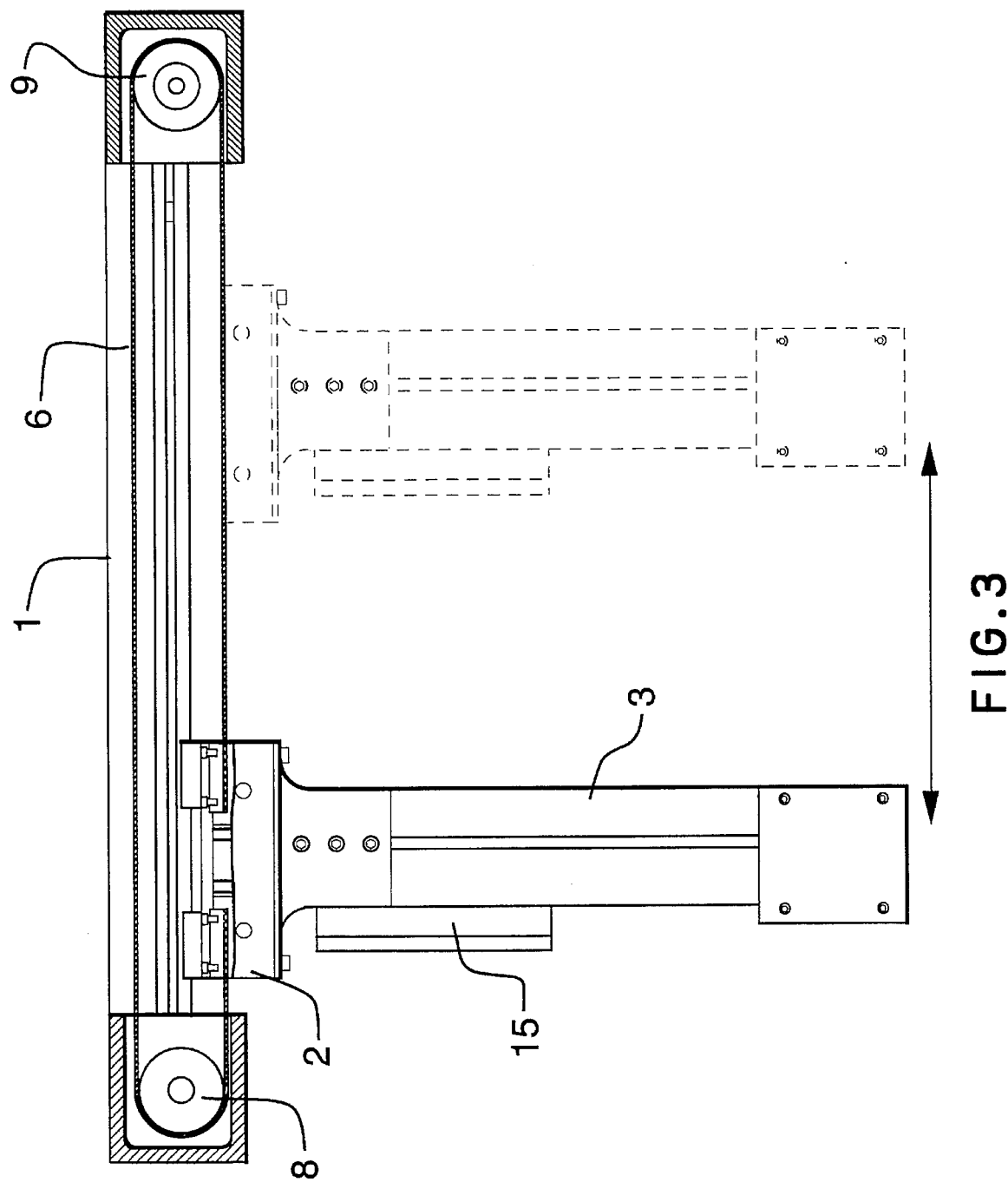
FIG. 3 is a bottom cross-sectional view of the preferred embodiment, showing the belt which moves the first slide and second rail along the first rail.
Figure 4:
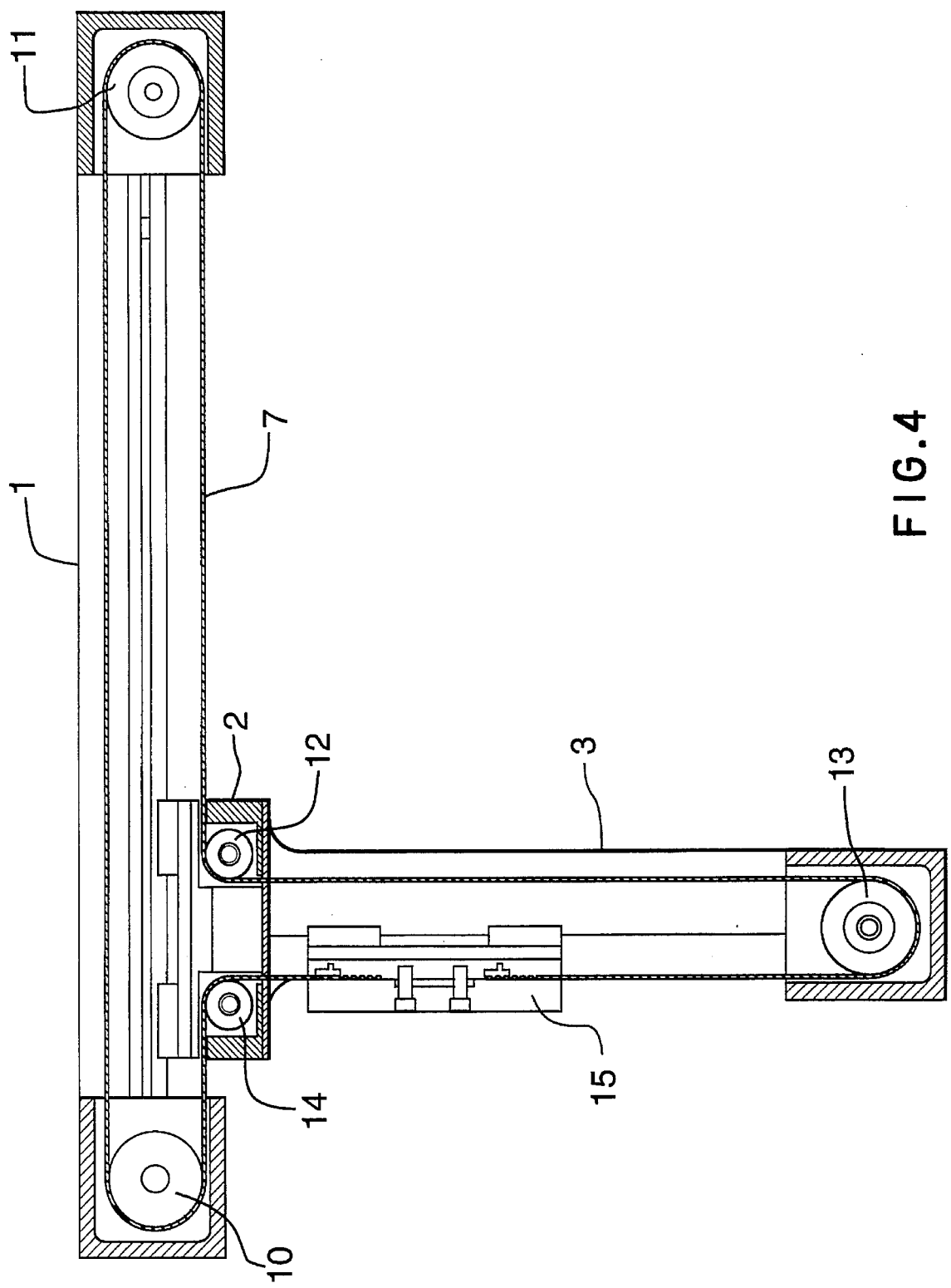
FIG. 4 is a top cross-sectional view, showing the belt which produces movement of the second slide along the second rail.
Figure 5:
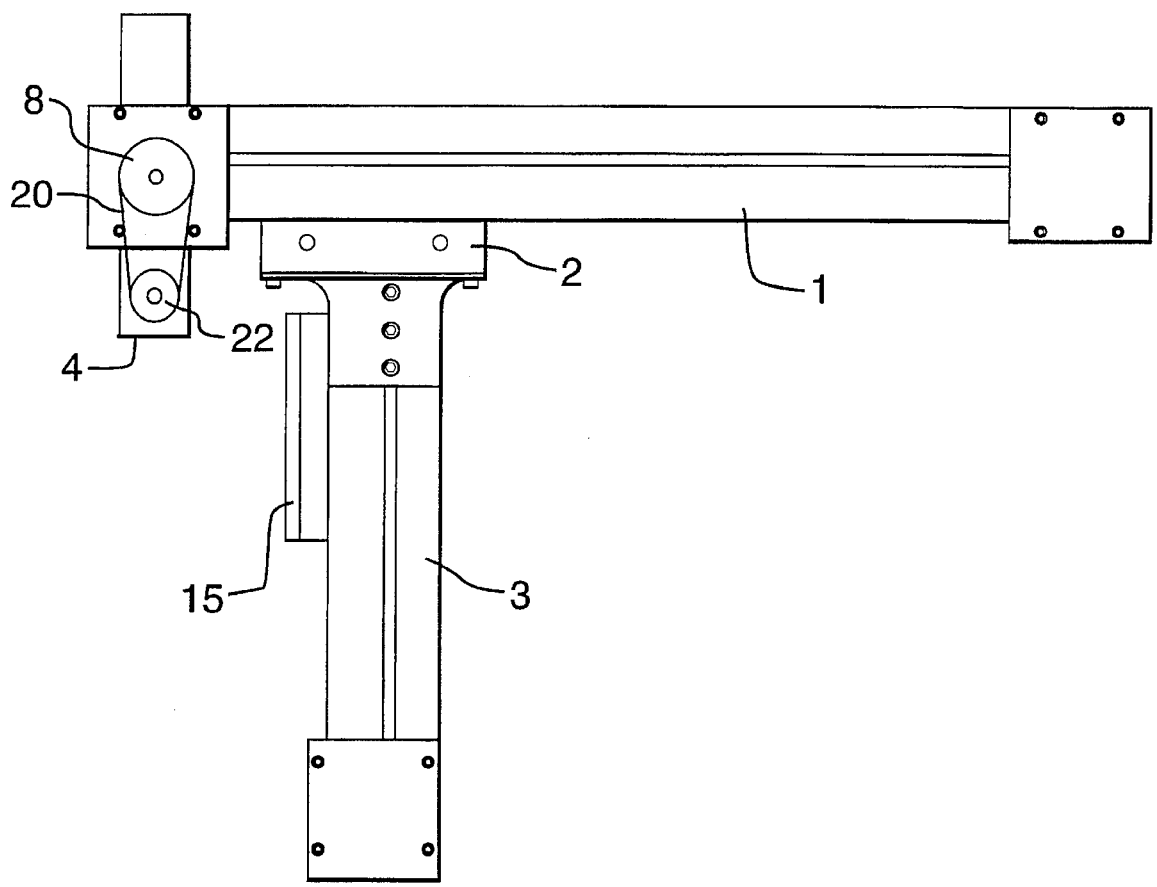
FIG. 5 is a top view of the preferred embodiment.
Figure 6:
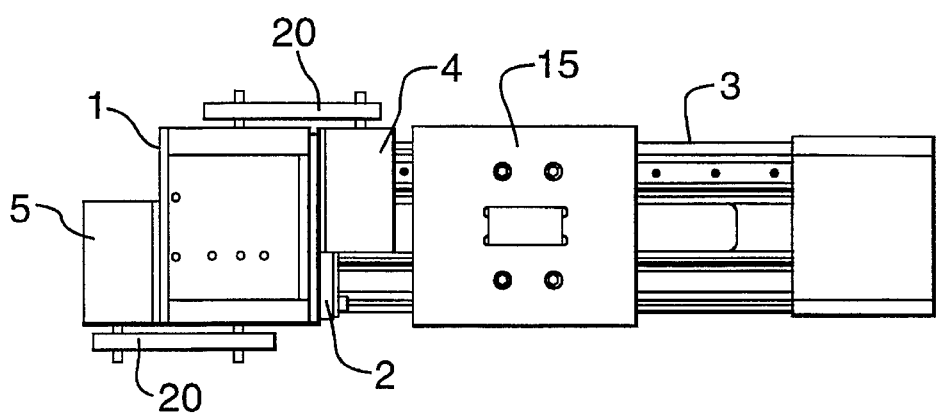
FIG. 6 is a side view of the preferred embodiment.

The preferred embodiment of the robot, as illustrated in FIGS. 1–6, has a first rail 1 which may be rigidly mounted to a work platform. A first slide 2 is mounted thereon, and is slidable along the first rail. A second rail 3 extends away from the first rail, and has one end secured to the first slide. First and second motors 4 and 5 are mounted in fixed positions relative to the first rail, preferably but not essentially at the same end of the rail as shown in FIGS. 1, 2 and 5. The motors drive first and second drive means respectively, such as a cables, chains, or preferably first and second gear belts 6 and 7.

The first belt 6 is attached to the first slide 2, thence routed around a first pulley 8 at a first location along the first rail (preferably near one end as illustrated), thence around a second pulley 9 at a second location spaced from the first location (preferably the other end of the first rail as illustrated), and thence back to the first slide. This routing produces movement of the first slide between the first and second locations, i.e. along the first rail, by operation of the first motor.

The second belt 7 is routed from a third pulley 10 at a third location along the first rail (preferably at one end of the first rail, e.g. opposite the first pulley 8 as illustrated), thence around a fourth pulley 11 at a fourth location spaced from the third location (preferably the other end of the first rail, e.g. opposite the second pulley 9 as illustrated), thence around a fifth pulley 12 mounted on the first slide, thence out the second rail and around a sixth pulley 13 mounted on the second rail (preferably near the end thereof), thence back towards the first rail and around a seventh pulley 14 mounted on the first slide, and thence back to and around the third pulley 10.

Control means, for example a programmable logic controller (PLC) or industrial controller, are provided for controlling and coordinating the first and second motors to produce movement of the first slide (and thus the second rail) along a first axis by operation of the first motor, and to produce movement along or about a second axis by operation of the second motor in coordination with the first motor.

As should be apparent, it is important that the first slide be accurately machined so that it slides smoothly on the first rail, with minimal play, and that the second rail be rigidly connected to the first slide to reduce vibration of the second rail in high velocity applications.

In the preferred embodiment, a second slide such as a tool plate 15 is slidably mounted on the second rail, for movement along the length of the second rail. The tool plate can be used to carry a gripper or other end effector or tooling (not illustrated), or any desired tool such as cutting and shaping tools, screwdrivers, cameras, presses, radiation sources, quills, chucks, spot welders, pens, etc. The robot permits accurate placement of the tool, while moving as little mass as possible by using stationary motors 4 and 5. The two axes of motion provided by the robot itself are thus X and Y. If desired, another axis such as z or θ or φ can be provided by the tool which is mounted on the tool plate. Power and control lines for the tool mounted on the tool plate may run through cavities in the rails, or they may run externally, depending on the requirements of a particular application.

Figure 7:
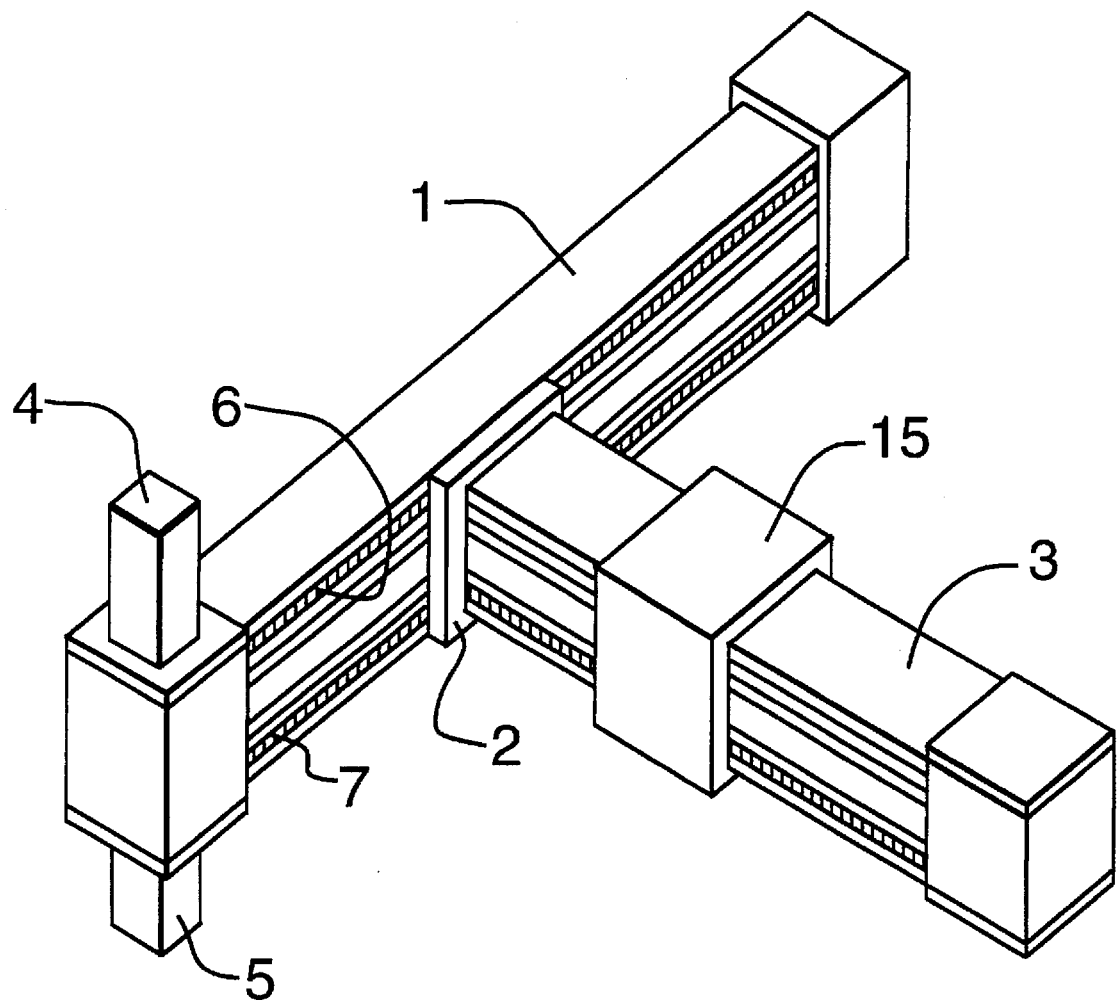
FIG. 7 is a perspective view similar to FIG. 1, showing an alternative form of second slide.

As shown in FIG. 7, the tool plate 15 could surround the rail, such that tooling could be attached from any of its surfaces, in any direction. The configuration of the tool plate could be varied considerably, to suit the desired task, and is clearly not limited to the shapes and configurations shown in FIGS. 1 and 7, those being merely two examples.

Figure 8:
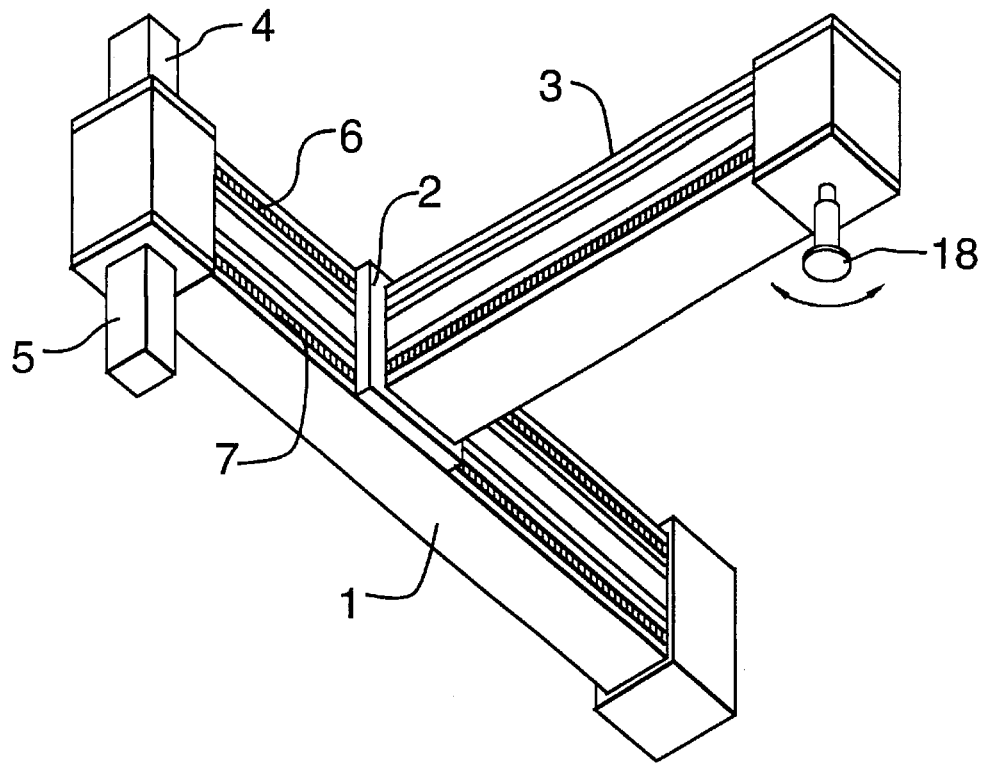
FIG. 8 is a perspective view of an alternative embodiment, from underneath, in which the second belt produces rotation of a rotatable element, instead of translation of a second slide.
Figure 9:
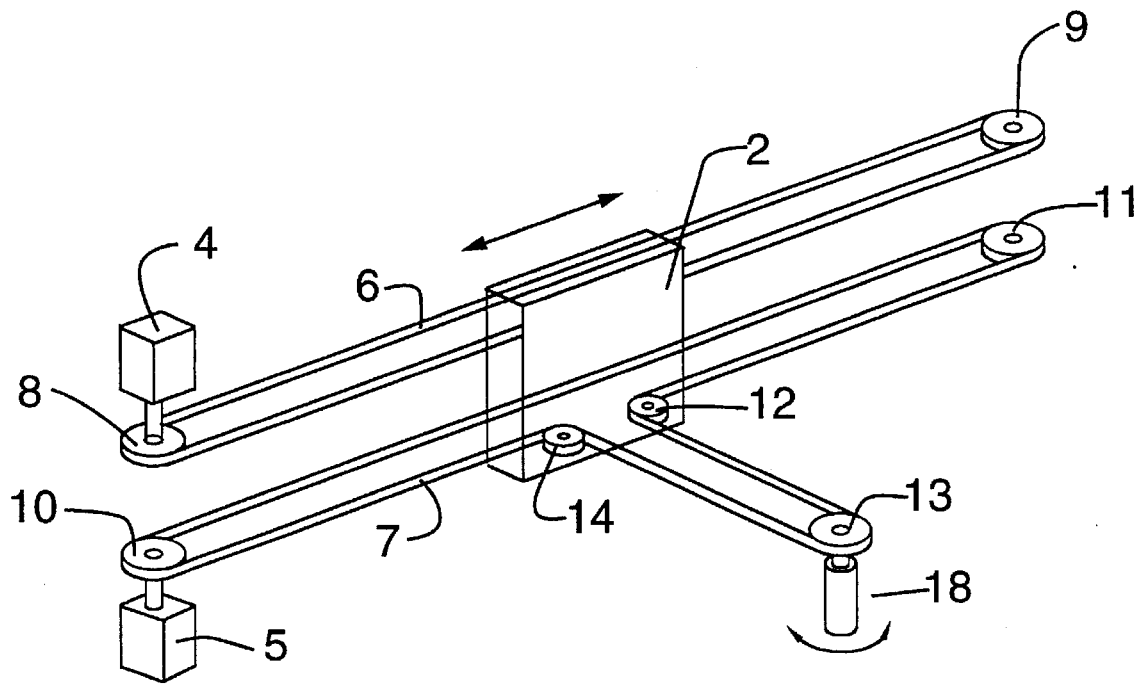
FIG. 9 is a schematic perspective of the alternative embodiment of FIG. 8, showing the principle of operation.

In the alternative embodiment shown in FIGS. 8 and 9, the second belt 7, rather than moving a slide, is connected to rotate a rotatable element 18, to which a rotating tool may be attached. The rotatable element may be directly connected to the sixth pulley 13, or may be a separate element located elsewhere along the second rail.

The two motors 4 and 5 may be located at the same end of the first rail, or at opposite ends. This provides flexibility regarding the space in which the invention may be installed. If desired, although not optimal, the motors could also be installed anywhere along the first rail, preferably with a driving pulley around which the belt is wrapped for increased contact to avoid slippage.

Figure 10:
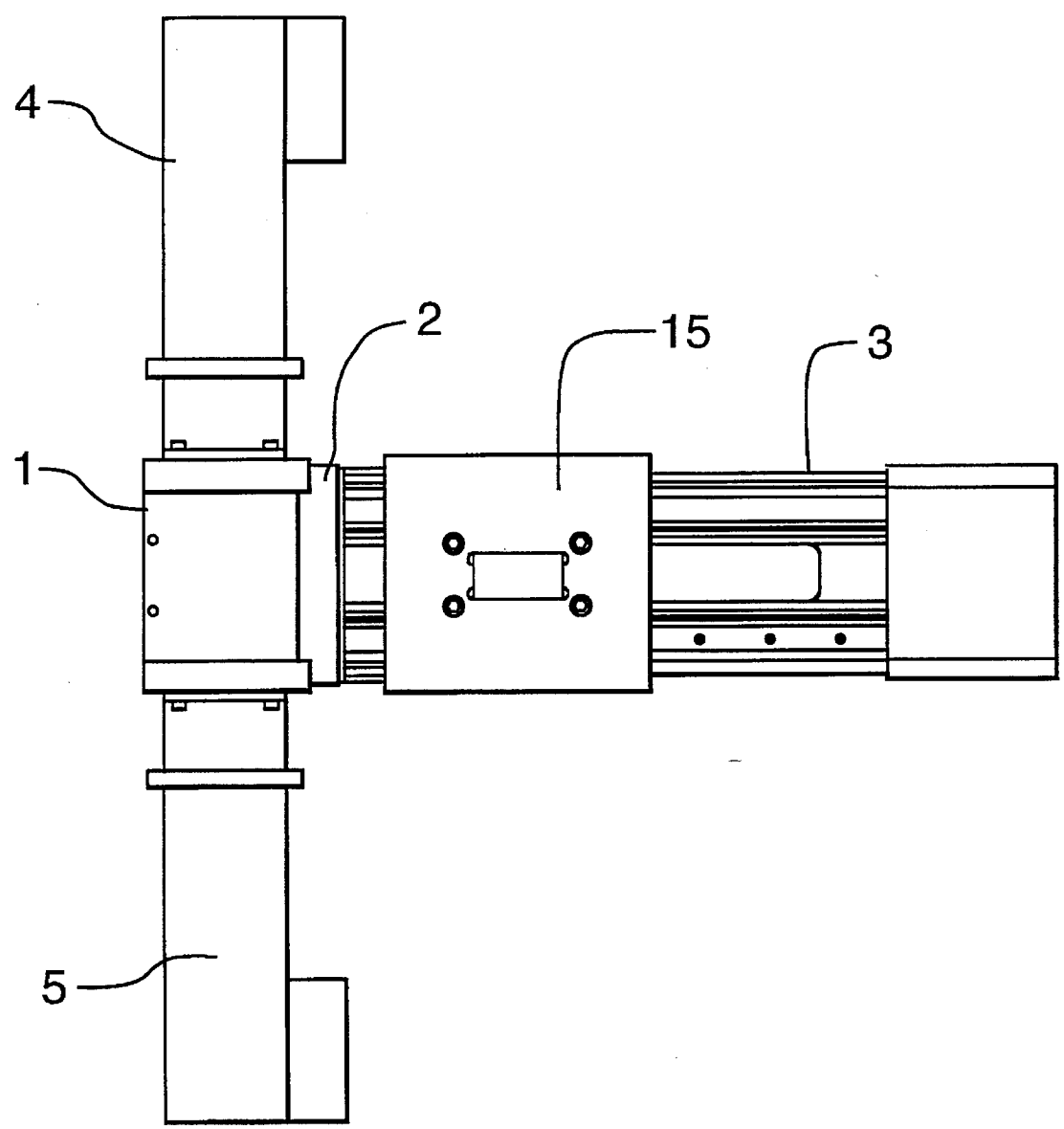
FIG. 10 is a view similar to FIG. 6, but showing an alternative motor arrangement.

Preferably, the motors drive their respective pulleys as shown in FIGS. 1 and 5, i.e. via drive belts 20. In FIG. 5, for example, a drive belt 20 drives the first pulley 8. The diameters of the first pulley 8 and the pulley 22 on the motor drive shaft are matched to provide the desired ratios for the particular motor and application. Alternatively, as shown in FIG. 10, the motors may extend straight out from the drive locations, with connections to the respective pulleys via gearboxes, with the gearboxes providing the desired matching between motor rpm and pulley rpm.

Other drive arrangements are possible. For example, there could be direct connection of the motors in some cases, or via a gearbox, as shown in FIGS. 7–9. In other cases, the pulley axes could be parallel to, perpendicular to, or skewed with respect to the motor axis, through use of any conventional drive connection or transmission means.

In the preferred embodiment, gear belts are used as the drive means, but obviously other similar means such as cables, chains, or non-ribbed belts may also be used. Some means will obviously be better than others at providing accurate and reliable positioning, without slippage. For drive means which may be prone to slippage or stretching or other problems which may affect accurate positioning, the control means may include feedback from a mechanical, electrical, or magnetic positioning indicator or sensor, or from a vision system.

With reference now primarily to FIG. 2, the principle of operation of the invention will now be explained in greater detail. The effect of operation of each motor when the other motor is not operating will be considered first. Then, the combination of both motors will be considered.

The first motor 4 drives the belt 6 which is connected to the first slide 2. When this motor operates to rotate the first pulley 8 in a clockwise direction (as viewed in FIG. 2), the first slide is pulled towards the motor. This movement causes a movement of the second slide 15 away from the first rail, because the fifth and seventh pulleys 12 and 14 are mounted on the first slide, so they move along the second belt 7, which produces movement of the belt relative to the sixth pulley 13. This produces movement of the second slide, and counterclockwise rotation of the sixth pulley. In the alternative embodiment shown in FIGS. 8 and 9, this would produce counterclockwise rotation of the rotatable element 18.

The displacement of the second slide along the X-axis is equal to the displacement of the first belt along the Y-axis, so the second slide moves at 45 degrees relative to the first rail, if the second motor 5 is not operating.

If the first motor is stationary and the second motor 5 is rotated in clockwise fashion (as viewed in FIG. 2), it can be readily seen that the second slide 15 is pulled towards the first rail, and the sixth pulley also rotates clockwise. In the embodiment shown in FIGS. 8 and 9, this rotation of the motor results in clockwise rotation of the rotatable element 18.

Now consider what happens when both motors are operated synchronously. If both first and third pulleys 8 and 10 are rotated clockwise (as viewed in FIG. 2) at the same belt speed, the first slide 2 will move towards the motors, but the portion of the second belt 7 between the second motor 5 and the seventh pulley 14 will be pulled in at the same rate, to cancel out any movement of the second belt relative to the fifth, sixth and seventh pulleys. The second slide 15 will thus translate along the X-axis, with no movement in the Y-axis. In the alternative embodiment, there will be no rotation of the rotatable element 18.

It is thus possible to move and position the second slide 15 anywhere in the X-Y plane by controlling the speed and direction of the operation of the motors with respect to each other. In the preferred embodiment, a motion controller with appropriate control software and stepper motors and/or servo drives are used to achieve such control. However, it is also possible to do the same through any type of analog or digital electronic circuitry, or other means of control.

In the alternative embodiment, it is possible to move the rotatable element in one dimension, and rotate it or not rotate it as desired, whether clockwise or counterclockwise.

The geometry of the apparatus could result in backlash, where motion is imparted from one belt to another unintentionally. For example, when the second motor rotates clockwise (as viewed in FIG. 2), the first slide could be pulled towards the motors. This backlash may be prevented by a braking mechanism, which is achieved in the embodiments disclosed here, through the use of a direct servo motor. This type of motor resists rotation when not operating. Therefore, the motor driving the first belt keeps the first slide in place rigidly. Alternatively, a braking mechanism could be provided to prevent the backlash movement of the first slide. This braking mechanism would be engaged in respect of the belt which is not driven at any particular time. It would thereby that a belt which is not being driven is not moved due to the movement of the other belt. Depending on the application and the accuracy and speed required from the invention, different types of motors and braking mechanisms may be used.

It will be appreciated that the above description related to the preferred and alternative embodiments by way of example only. Many variations on the invention will be obvious to those knowledgeable in the field, and such obvious variations are within the scope of the invention as described and claimed, whether or not expressly described.

For example, in other embodiments, other axes of motion and/or other coordinate systems may be selected as desired, using the same configuration principle for the drive belts or other drive means.

Other variations may arise as a result of using different materials and components to implement the invention. For example, the drive transfer means may be made of other material such as steel cables or chains. Motors may be any kind of motor, depending on the requirements of a specific embodiment of the invention; electromagnetic principle of operation, pneumatic, hydraulic, or other. The control mechanism may also be different from computer software used in the preferred embodiment. Analog or digital circuitry of various sophistication may be used, depending on the nature of the application for which the embodiment is used. Many other such obvious variations are also possible.

What is claimed as the invention is:

1. A two-axis robot comprising:

a first rail extending in one direction, having a first slide mounted thereon, said first slide being slidable along said first rail;

a second rail extending away from said first rail and having one end secured to said first slide;

first and second motors mounted in fixed positions relative to said first rail, said motors driving first and second drive means respectively, each said drive means being selected from the group consisting of a belt, a cable, and a chain;

said first drive means being attached to said first slide, thence routed around a first pulley at a first location along said first rail, thence around a second pulley at a second location spaced from said first location, and thence back to said first slide, whereby said first slide may be moved between said first and second locations by operation of said first motor;

said second drive means being routed from a third pulley at a third location along said first rail, thence around a fourth pulley at a fourth location spaced from said third location, thence around a fifth pulley mounted on said first slide, thence out said second rail and around a sixth pulley mounted on said second rail, thence back towards said first rail and around a seventh pulley mounted on said first slide, and thence back to and around said third pulley;

a second slide, slidably mounted on said second rail for movement therealong, secured directly to said second drive belt means between said sixth pulley and one of said pulleys on said first slide; and control means for controlling and coordinating said first and second motors to produce movement of said first slide along said first rail by operation of said first motor, and to produce movement of said second slide along said second rail by operation of said second motor in coordination with said first motor.

2. A robot as recited in claim 1, where said first motor is connected to drive said first pulley, and said second motor is connected to drive said third pulley.

* * * * *